United States Patent [19]

Eckstein et al.

[11] 4,045,192

[45] Aug. 30, 1977

[54] MOBILE FILTERING APPARATUS FOR KEEPING PATIENTS UNDER ASEPTIC CONDITIONS

[75] Inventors: Wolfgang Eckstein, Sereetz; Frank Benthin, Lubeck-Israelsdorf, both of Germany

[73] Assignee: Dragerwerk Aktiengesellschaft, Germany

[21] Appl. No.: 717,694

[22] Filed: Aug. 25, 1976

[30] Foreign Application Priority Data

Sept. 6, 1975 Germany ............................ 2539743

[51] Int. Cl.[2] ............................................. B01D 47/00

[52] U.S. Cl. ........................................ 55/222; 55/269; 55/279; 55/356; 55/385 A; 55/414; 55/473; 55/502; 55/DIG. 29; 98/115 LH; 261/104; 261/154; 128/1 R

[58] Field of Search ................. 55/222, 269, 279, 410, 55/414, 473, 356, 385 A, 502, DIG. 29; 98/115 LH, 33, 36; 128/1 R; 261/103, 104, 106, 107, 142, 153, 154; 62/91; 21/74

[56] References Cited

U.S. PATENT DOCUMENTS

| | | | |
|---|---|---|---|
| 2,628,083 | 2/1953 | Rense | 55/279 |
| 3,277,638 | 10/1966 | Soltis | 55/DIG. 29 |
| 3,385,036 | 5/1968 | Webb | 55/DIG. 29 |
| 3,666,007 | 5/1972 | Yoshina et al. | 55/158 |
| 3,861,894 | 1/1975 | Marsh | 55/316 |

*Primary Examiner*—Bernard Nozick
*Attorney, Agent, or Firm*—McGlew and Tuttle

[57] ABSTRACT

A mobile air filtering apparatus for hospital rooms, comprises a housing having an inlet and an outlet. A pre-filter is located at the inlet and a fan for directing air in succession through a heater, a diffusion foil moistener and a mechanical filter. The diffusion foil moistener is located between the heater and the mechanical filter and it includes a heat exchange conduit for conducting the water to the moistener which is coiled around the filter. The filter housing is mounted on a fork-shaped arm which is carried on a stand in an adjustable position and the stand is moved around with its associated carriage filter. The diffusion foil comprises a double spirally wound tube having an inlet feeding in one spiral direction and an outlet feeding in an opposite spiral direction which is located alongside the inlet and which is held in position by spacers and bracings on a supporting plate which has air passage openings therethrough so that the air travels over the successive coil windings of the circulated liquid. The outlet of the device is covered by a removable diffuser.

9 Claims, 4 Drawing Figures

MOBILE FILTERING APPARATUS FOR KEEPING PATIENTS UNDER ASEPTIC CONDITIONS

FIELD AND BACKGROUND OF THE INVENTION

This invention relates in general to the construction of filtering devices and, in particular, to a new and useful mobile air filtering device for keeping patients in hospital rooms under aseptic conditions.

DESCRIPTION OF THE PRIOR ART

Wound infections which occur after successful surgical treatment and which also occur in respect to bare injuries, such as burns, will retard healing of the patient and bring them into additional danger. The occurrence of a wound infection depends to a large extent on the care with which the precautions of asepsis are carried out in the sickrooms. The supply of germ-free air is one of the most secure possibilities for preventing pathogenic germs from penetrating into the open wounds.

At the present time, there is a known air suction and filtering device which is supported on a frame which may be set up on the floor and is intended for nursing patients in a separate, dust-free, space. The filtering device forms the top wall of the space which is laterally closed by walls supported by the frame. At least one of the lateral walls is made of a transparent plastic material. Along their entire periphery, the walls end at a small distance from the floor. The substantially vertical air current produced by the blower and purified by the filtering device escapes from the dust-free space at the floor level. The air current must prevent a penetration of non-filtered air into the space. The lateral walls may be designed as foldable slide curtains. They may be provided with passage openings or with openings which are closed by gloves or bags. Such a device is intended for nursing patients who are confined to bed without having to be held in complete isolation. With this arrangement, it is possible to bring up treatment and examination apparatus to the patient from any side without having to enter into the isolated space. The entire assembly forming the dust-free space is designed for transportation into other rooms.

Such a known arrangement is very bulky and encloses not only the patient, but also his bed. The air supplied is only filtered, and no moistening or heating is provided. The patient is isolated from his environment by the walls by which he is surrounded, even if the walls are of a transparent material. For any activity of the nursing personnel, the walls must be opened in order to permit access. This, however, disturbs or interrupts the current or flow of germ-free air so that non-filtered, and thereby, germ-loaded air can penetrate to the patient. The possibility of equipping the personnel entering or intervening into the isolated space with germ-free suits is expensive and, in emergency cases, not even practicable. The gloves or bags which are provided may also serve only as emergency devices for contacting the patient.

In another known device, a system of isolation to be used in operating theaters or at intensive care stations, comprises a mounting bracket with a canopy which is provided with casters and, therefore, is movable. The device is moved from the head of the patient's bed so that the canopy projects over the bed. The bracket accommodates a fan which takes in ambient air through a pre-filter and blows the air through a high-performance mechanical filter without turbulence, into the canopy, wherefrom, the air is directed through a diffuser to and over the patient and his bed and to the outside. The intention is to place the patient in a bacteria-free space without confining him to a personal isolation which would be caused by a tent, screen or cabin.

The above system of isolation does not cramp the patient by surrounding walls but, due to the large distance of the canopy and, thereby, the air feed area from the floor, the system does not ensure that an air current with a minimum turbulence is produced which would prevent germs from penetrating into the pure air stream. Any movement of the patient himself or in his neighborhood disturbs the germ-free air current. Devices for ensuring the physiological conditions, such as humidity and temperature, are not provided either. The device does not make sure that, for example, with open wounds, an exsiccation is prevented. ("Sterair Isolation System" in the periodical MEDIZINAL-MARKT 5, 1969).

SUMMARY OF THE INVENTION

The present invention provides an apparatus which ensures that the turbulent ambient air which is not germ-free is prevented from contacting the patient or certain parts of his body. This is ensured by a permanent exposure of the part to a stream of germ-free air which satisfies the physiological conditions, particularly in respect to humidity and temperature which are necessary for the patient. The patient is to be disturbed as little as possible in his psychic condition and the activity of the nursing personnel is not rendered more difficult.

For this purpose, in accordance with the invention, a diffusion foil moistener is provided between the heating device and the mechanical filter and heat exchange pipes for conducting the water necessary for the moistening are trained so that they extend around the mechanical filter along the wall of the housing. With such an arrangement, due to the mobility of the filtering apparatus, a germ-free zone can be produced in a simple and sure manner around the patient or his body parts where the open wounds occur. Because of the mobility of the filtering apparatus, the air stream which has no turbulence can be directed exactly onto the important areas of the patient's body. The limit zone in which turbulences may occur in the close vicinity of a person can be reduced to a value of less than 0.3m. This applies both to the patient and the nursing personnel. Thus, a contamination would be possible only by direct contact with the patient. In normal cases, it is sufficient for the personnel to use a protective mouth covering. The velocity of the purified air and the conditioned air stream, which is about 0.5 m per sec., is still not disturbing. With the diffusion foil moistener and the heat exchange pipes, optimum environmental conditions are ensured which are to be sought for the well-being of the patient whose power of resistance is weakened. For the successful healing of open wounds, a correctly selected humidity of the germ-free air current is an essential factor. Since no surrounding curtains or walls are provided, there is no isolation. The patient can easily maintain contact with the outside world. The equally simple possibility of supervising by nursing personnel will eliminate any violation of the sterility conditions. The risk of such violation is run at any time when work is to be done during longer periods of time under the observance of sterile conditions, which is very exhausting.

The heat exchange pipes prevent a condensation of water in the mechanical filter and in the interior of the housing. This makes it possible to manage without an additional heating. It is ensured in a simple manner that the temperature of the walls of the housing and the mechanical filter does not drop below the dew point temperature of the moistened air.

In an advantageous embodiment of the invention, the diffusion foil of the diffusion foil moistener is a flexible tube which is held in position in a spirally wound configuration by spacers and corrugated bracings and is secured to mountings or supports which are provided with air passage openings. The water supply can be provided in the foot of the support stand for the filtering device. The application in the moistener of the diffusion principle permits a space-saving construction. The simple and secure humidification on this principle, according to which water can never pass into the air stream in liquid form, makes the attendance simple and thereby eliminates errors which could irritate the patient and affect his recovery.

Capillary or radial blowers are advantageously used for feeding the air into the filter and this permits the use of small dimensioned fans. A substantial advantage, however, is also in the nearly silent operation which results in a low noise level so that there is no disturbing effect, not even during a longer stay of the patient below the filtering apparatus. The rotor of the capillary blower may also accommodate a pre-filter and this would lead to a further reduction of the size of the air feed unit.

With the use of a mechanical filter of a filtering material which comprises a bactericide, it would not be necessary to carry out extensive checking for germs. Such filtering material ensures that the germs intercepted at the inlet side of the mechanical filter cannot grow through the filtering material and pass into the filtered air at the clean side and thereby to the patient. It is also possible, however, to use ultraviolet radiators in a manner known per se and these are mounted downstream of the mechanical filter. For special cases, the air outlet of the apparatus may be provided with a flexible apron extending along the periphery thereof. This is advantageous in applications where it is not possible to position the air outlet of the apparatus close to the patient. It may also happen that strong air currents in the horizontal direction are present which would overcome the normal, substantially vertical, air flow from the filtering apparatus and possibly cause a penetration of contaminated air into the purified stream. The apron would prevent such a penetration by a stronger concentration of the germ-free air stream.

In a further aspect of the invention, the air outlet may be covered by a removable diffuser and the clamping frame may have a pressure switch mounted thereon. The diffuser which must necessarily be removed for switching off the device may be kept stored in a germ-free space. Therefore, there is no risk of contamination with pathogenic germs. A germ-free diffuser is then always available for the operation.

Accordingly, it is an object of the invention to provide a mobile air filtering device for keeping patients in hospitals under aseptic conditions, which comprises a housing which has an inlet for the inflow of air adjacent one end and an outlet for the discharge of air to the patient adjacent the opposite end and which includes a pre-filter air feeding means, a heater and a mechanical filter arranged in succession between the inlet and outlet and with a diffusion foil moistner located in the air stream between the heater and the mechanical filter which has a heat exchange conduit for conducting water to the moistener which is coiled around at least a portion of the mechanical filter.

A further object of the invention is to provide a filtering device which is simple in design, rugged in construction and economical to manufacture.

For an understanding of the principles of the invention, reference is made to the following description of a typical embodiment thereof as illustrated in the accompanying drawings.

DESCRIPTION OF THE PREFERRED EMBODIMENT

Figure 1:
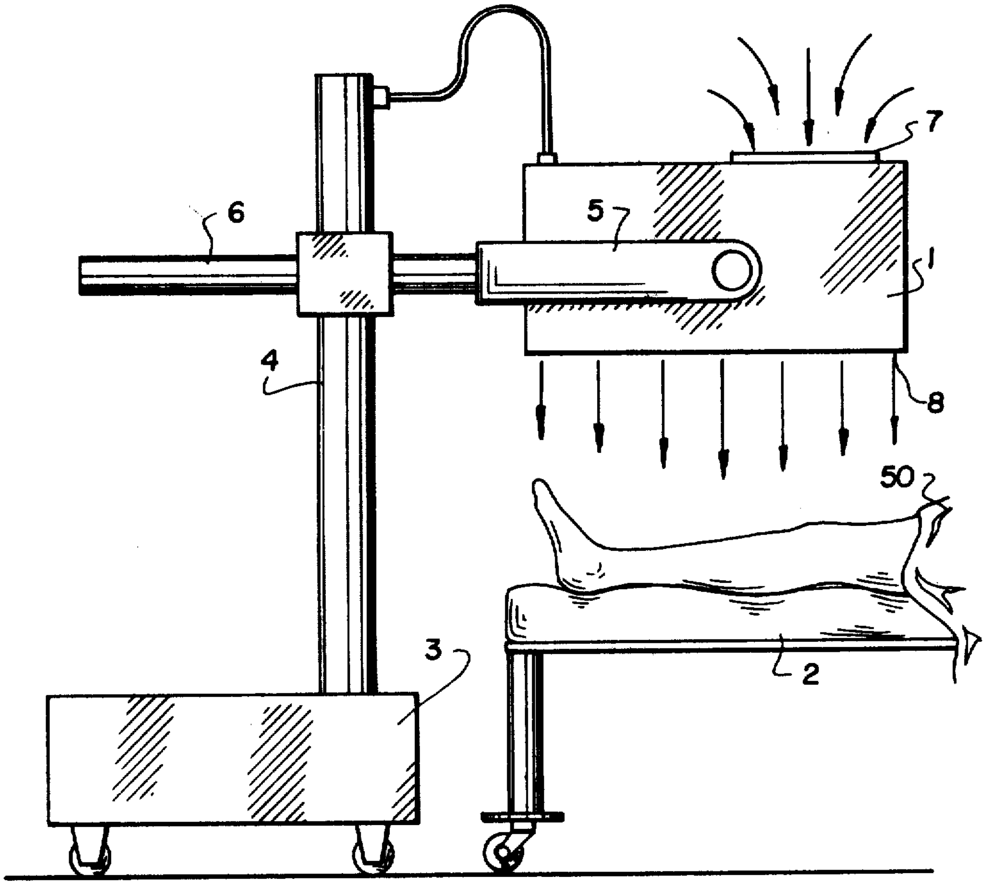
FIG. 1 is a side elevational view of a filtering device constructed in accordance with the invention shown in use in a hospital room.

Referring to the drawings in particular, the invention embodied therein comprises a mobile filtering apparatus 1, shown in FIG. 1, which is placed at the patient's bed 2 and produces a germ-free zone in the area of the open wound on the respective part of the patient's body. Filtering apparatus 1 is supported by a fork 5 of a cross-arm 6 which is mounted on a stand 4 carried by a carriage 3.

Figure 2:
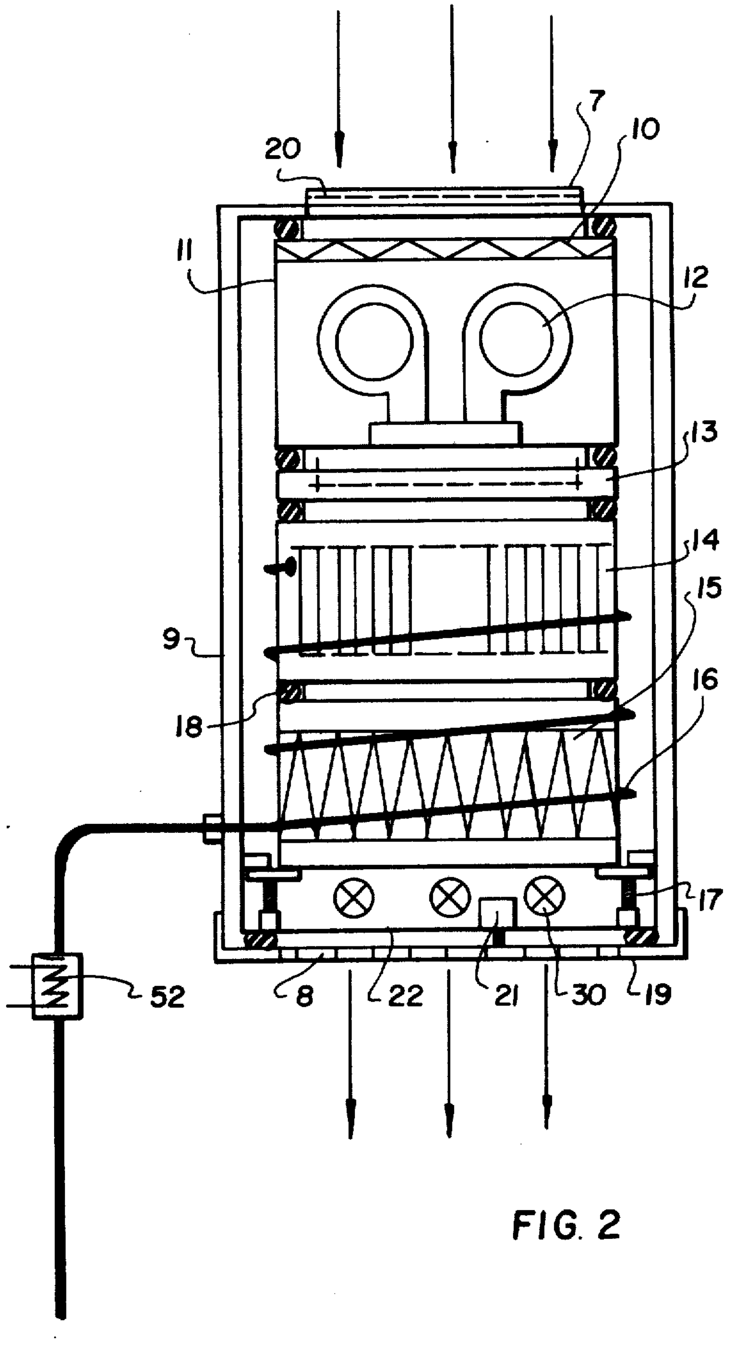
FIG. 2 is a longitudinal sectional view of the filtering device.

As shown in FIG. 2, the mobile filtering apparatus 1 is assembled of individual parts in the manner of building blocks which are placed within a housing 9. Proceeding in the downstream direction, the building blocks include a prefilter 10, an air feed unit 11, comprising air feeding means in the form of air feeders or capillary blowers 12, a heating device 13, a diffusion foil moistener 14 and a mechanical filter 15.

In accordance with a feature of the invention, the moisture is obtained through a heat exchange conduit 16 which has coils which extend around the mechanical filter 15 within the exterior walls of the housing 9. Through the heat exchange pipes, the tempered water from the water supply which is maintained in carrige 3 is fed by means of a pump in the carriage into diffusion foil moistener 14 through the heat exchange conduits 16.

In accordance with a further feature of the invention, the individual building blocks are firmly pressed against each other with seals 18 interposed therebetween by means of a clamping mechanism 17 contained near the outlet end of the housing 9. Housing 9 is closed by a diffuser 19 at the outlet end and an air inlet 7 is covered by a protective grid 20. The air, after it has been freed of germs, leaves the mechanical filter 15 and is blown out through diffuser 19 against the patient 50 who is lying on a bed 2. A pressure switch 21 is provided on a clamping frame 22 and it is accessible through diffuser 19 to switch filtering apparatus 1 on or off.

The temperature of the air which is supplied to the patient must be higher than the temperature of the ambient air. A heating device 13 heats the air supplied to the filtering unit up to an amount equal to that difference. The heating device is of a conventional design. In addition, a heater 52 may be employed for heating the water circulated through the heat exchange pipes or conductors 16.

Figure 3:
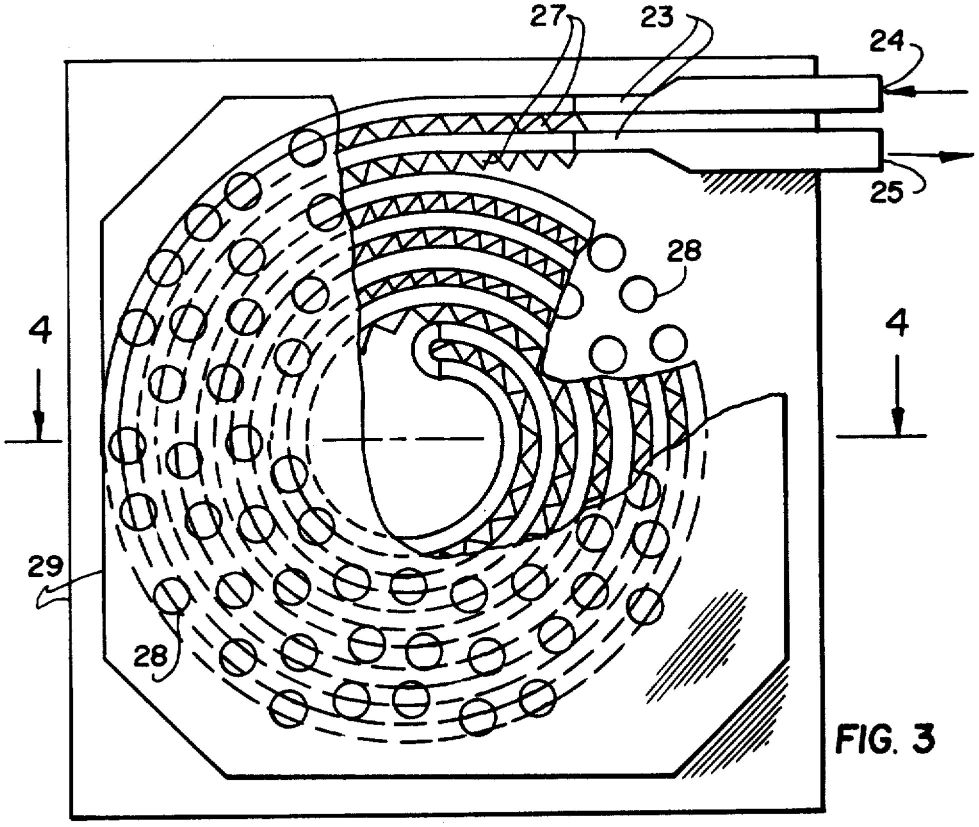
FIG. 3 is a top plan view of the liquid moistener, with a portion of the top plate broken away.
Figure 4:
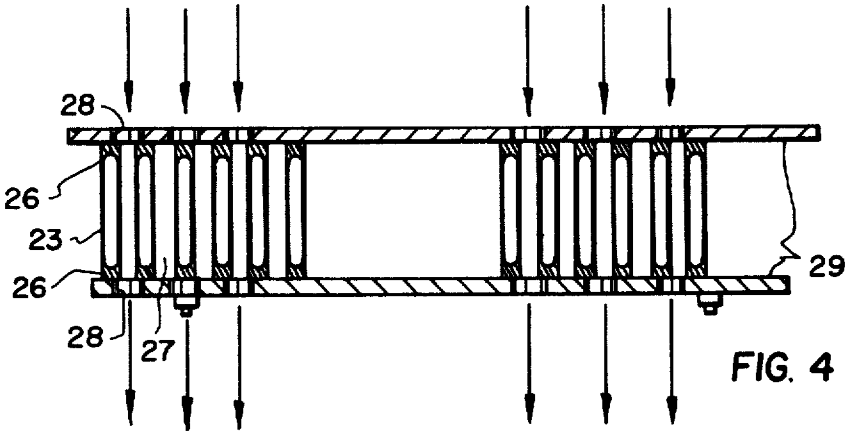
FIG. 4 is a transverse sectional view through a portion of the filter taken along the line 4—4 of FIG. 3.

As can be best seen in FIGS. 3 and 4, the moistener 14 operates on the diffusion foil principle. A diffusion foil is designed as a continuous flexible tube 23 which is waterproof but permeable to water vapor. The tube is spirally wound both in a forward direction and then in a return backward direction. An inlet 24 is located adjacent an outlet 25 and spacers 26 and a corrugated bracing 27 secure the position of the flexible tube and ensure the spacing of the spiral turns. The corrugated bracing 27 also permits the flow of the air to be humidified axially through the unit. The air, while flowing past the walls of the flexible tube 23, will become humidified by the water vapor penetrating through the foil and entrained by the air stream. The tube 23 is held in a spirally wound position be the spacers 26 and the bracings 27 which are secured to supporting plates 29, provided with air passage openings 28.

Mechanical filter 15 intercepts the germs which are present in the ambient air. It is a high-performance filter of the class S. The filtering material may comprise a bactericide. In order to destroy germs which might have penetrated from the backside through air outlet 8 during the periods of time when the apparatus is switched off, ultraviolet radiators 30 may be provided in the space adjacent air outlet 8 at the upstream side. This is purposeful also in cases where mechanical filters 15 comprise normal filtering material.

Due to the inventive design of the mobile filtering apparatus 1, a simple and secure disinfection is made possible. The disinfectant can be supplied to air inlet 7 through a suitable connection and then exhausted through air outlet 8 to the outside or may also be circulated through a disinfecting device. Each individual building block portion or separate unit may be removed from the housing for separate disinfection.

While a specific embodiment of the invention has been shown and described in detail to illustrate the application of the principles of the invention, it will be understood that the invention may be embodied otherwise without departing from such principles.

What is claimed is:

1. A mobile air filtering apparatus for keeping patients in hospital rooms under aseptic conditions, comprises a housing having an inlet for the inflow of air adjacent one end and an outlet for the discharge of filtered air to the patient adjacent the opposite end, a pre-filter located adjacent said inlet, air feeding means, a heater, and a mechanical filter arranged in succession between said inlet and said outlet, and a diffusion foil moistener located in the air stream between said heater and said mechanical filter and having a heat exchanger conduit for conducting water through the moistener which is coiled around said filter.

2. A mobile air filtering apparatus, according to claim 1, wherein said diffusion foil comprises a flexible tube, means for holding said tube in a spirally wound configuration with successive windings spaced apart and support means for said tube permitting the flow of air over the surface thereof.

3. A mobile air filtering apparatus, according to claim 1, wherein said air feeding means comprise at least one blower.

4. A mobile air filtering apparatus, according to claim 1, wherein said air feeding means includes a capillary blower having said pre-filter.

5. A mobile air filtring apparatus, according to claim 1, wherein said air feeding means comprise radial blowers.

6. A mobile air filtering apparatus, according to claim 1, wherein said mechanical filter comprises bactericides.

7. A mobile air filtering apparatus, according to claim 1, including an ultraviolet radiator mounted in the air stream downstream of said mechanical filter.

8. A mobile air filtering apparatus according to claim 1, wherein said outlet includes a removable diffuser therein and a pressure switch provided in said housing.

9. A mobile air filtering apparatus, according to claim 1, including sealing means disposed between said air feed means, said heater, said diffusion foil moistener and said mechanical filter, said housing comprising a frame surrounding all of said parts and clamping means for clamping said parts together against said frame.

* * * * *